C. MORGAN.
Potato-Planter.

No. 14,270. Patented Feb. 12. 1856.

Witnesses:
Henry Howson
William E. Walton

Inventor:
Charles Morgan

UNITED STATES PATENT OFFICE.

CHARLES MORGAN, OF PHILADELPHIA, PENNSYLVANIA, ASSIGNOR TO SAMUEL EMLEN.

IMPROVEMENT IN POTATO-PLANTERS.

Specification forming part of Letters Patent No. 14,270, dated February 12, 1856.

*To all whom it may concern:*

Be it known that I, CHARLES MORGAN, of the city of Philadelphia and State of Pennsylvania, have invented a new and Improved Machine for Planting Potatoes; and I do hereby declare that the following is a full, clear, and exact description of the same, reference being had to the accompanying drawings, and to the letters of reference marked thereon.

My invention relates to improvements in potato-planters in which a fork is used for extracting the pieces of potato from a hopper; and it consists in furnishing a frame similar to that of an ordinary wheelbarrow with a hopper for receiving the pieces of potatoes to be planted. At one side, and near the bottom of this hopper, is an opening, in and out of which a fork with any convenient number of prongs is moved horizontally by means of levers and rods actuated from a pin on a toothed pinion, which gears into and is driven by a toothed wheel secured to the same axle as the driving-wheel, which turns in boxes on the end of the frame as the latter is wheeled over the ground. The prongs of the horizontal fork pass through and are guided by a cross-bar of the frame, against which cross-bar the piece of potato extracted from the hopper by the fork through the opening is drawn, and, being thereby released from the prongs, drops through a tube to the bottom of the furrow. In order that the pieces of potatoes may be stirred up and become so situated in the hopper as to be easily penetrated by the fork, I furnish the bottom of the hopper with a tube having a plunger, to which a vertical reciprocating motion is imparted by means of levers and rods connected to those which operate the fork in such a manner that when the fork is withdrawn from the hopper the plunger is projected upward into the same, and when the fork is projected into the interior of the hopper the plunger is withdrawn. A projection from the plunger serves to partially cover the opening in the hopper when the fork is withdrawn, and thereby prevents the pieces of potatoes from tumbling out onto the ground. As the fork advances toward the hopper, however, this projection is withdrawn simultaneously with the plunger.

The whole machine is so arranged and designed that by wheeling it over the ground the potatoes are deposited at suitable intervals along the bottom of the furrows with rapidity and but little exertion on the part of the operator.

In order to enable others skilled in the art to make and use my invention, I will now proceed to describe its construction and operation.

Figure 1:
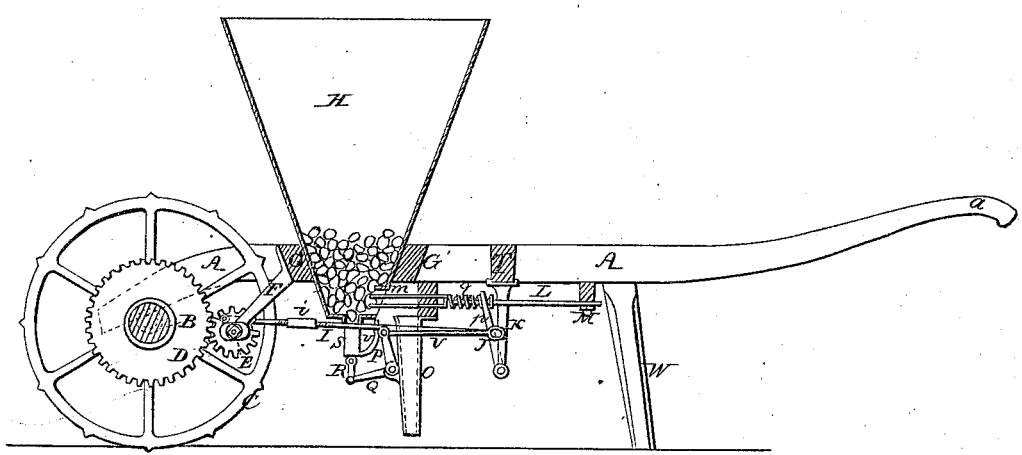
Figure 2:
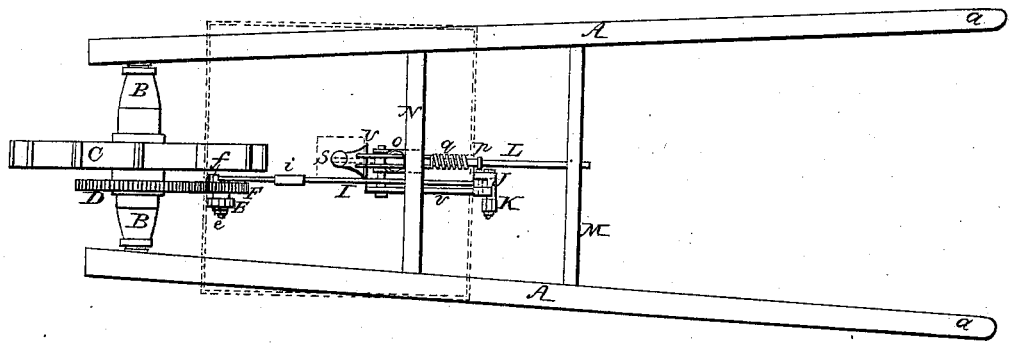

On reference to the drawings which form a part of this specification, Figure 1 is a sectional elevation of my improved potato-planter; Fig. 2, a ground plan of the same with the hopper removed.

A and A' are the two side frames of the machine, furnished at one end with handles $a\ a$, similar to those of an ordinary wheelbarrow, and at the other end with boxes for the journal of the axle B, on which is secured a wheel, C, having on its periphery a series of pointed projections for maintaining a hold on the ground.

On the axle B is secured a toothed wheel, D, gearing into the pinion E, which runs loose on a pin, $e$. The latter is secured to the end of the hanger F, suspended from the cross-piece G. Two of these cross-pieces, G and G', connect the opposite frames A and A' together, and are beveled for receiving the hopper H.

To the wheel E, and at a suitable distance from its center, is secured a pin, $f$, on which is connected the end of the rod I, the latter having a nut, $i$, with right and left handed thread for lengthening and shortening the said rod. The opposite end of this rod is connected to a pin on the lever J, which vibrates on a stud secured to the bottom of the hanger K on the cross-bar T.

The top of the lever J has an oblong eye, through which passes the horizontal rod L. The latter is guided at one end by passing through a cross-piece, M, secured to the frames A and A'. The other end of the rod is furnished with a fork having any convenient number of prongs $m$, and these prongs pass through and are guided by another cross-bar, N, also secured to the frames A and A'.

The eye of the lever J is confined between a collar, $p$, on the rod L and a spiral spring, $q$, surrounding the rod and bearing against a collar near the termination of the fork $m$.

To the cross-bar N is secured the tube O, in front of which is a lug for receiving a pin to which is secured the lever P. On the opposite side of the lug, and to the same pin, is attached the lever Q, the end of which is connected by means of a link, R, to a plunger, S, which fits in a tube at the bottom of the hopper H. The latter has an opening at the bottom in order to allow the prongs m of the fork to have free access to the interior, and the plunger S is furnished with a curved projection, U, which at certain intervals in the movements of the machine is raised across the said opening at the bottom of the hopper.

To the end of the lever P is jointed the rod V, the end of which is furnished with a slotted eye adapted to a pin on the lever J.

The frame A is furnished with legs W after the manner of an ordinary wheelbarrow.

The hopper H being filled with potatoes cut and prepared for planting, the operator takes the handles a a, and, raising the legs, wheels the machine over the ground, causing the wheel C, and with it the toothed wheel D, to revolve. This communicates motion to the pinion E, and, through the rod I, a vibrating motion to the lever J and a horizontal reciprocating motion to the rod L, causing the fork at the end of the latter to be moved in and out of the hopper H. Simultaneously with this movement the plunger S is caused to be raised up and down in the tube of the hopper by the rod V, connected to the lever J, and levers P and Q. As the machine is shown in the drawings, the fork is about withdrawing a piece of the potato, which it has previously pierced, from the hopper. The continued backward movement of the rod L draws the prongs m of the fork through the cross-bar N until the piece of potato, coming in contact with the latter, is released from the point of the fork and drops down the tube O into the bottom of the furrow. The slot at the end of the rod V is so regulated that the latter, and consequently the plunger S, remains stationary until the potato at the end of the fork is nearly clear of the opening of the hopper, when the plunger S is suddenly raised, stirring up the potatoes in the hopper. At the same time the curved projection also rises, covering the opening of the hopper and preventing the potatoes from dropping therefrom. On the return movement of the fork, however, the projection U is withdrawn from the opening, so as to allow room for the fork to penetrate the hopper.

It will be seen that the distance apart which the pieces of potatoes are dropped into the furrow will be regulated by the diameter of the pinion E compared with that of the wheel D, so that by removing the pinion E and replacing it by a larger or smaller one the pieces of potatoes may be dropped into the furrow at any distance apart required.

I do not desire to claim especially the use of forks in potato-planters for extracting the seed from a hopper, as such is described in the specification of Enoch Woods, January 10, 1865; but

What I claim, and desire to secure by Letters Patent, is—

The fork m and plunger S, with its projection U, in combination with the hopper H, the said fork and plunger being operated simultaneously, substantially in the manner and for the purpose set forth.

CHARLES MORGAN.

Witnesses:
HENRY HOWSON,
WILLIAM E. WALTON.